(12) United States Patent
Kang et al.

(10) Patent No.: US 12,488,474 B2
(45) Date of Patent: Dec. 2, 2025

(54) APPARATUS AND METHOD FOR CONTROLLING AUTONOMOUS VEHICLE

(71) Applicants: Hyundai Motor Company, Seoul (KR); Kia Corporation, Seoul (KR)

(72) Inventors: Yimju Kang, Seoul (KR); Hoon Lee, Gunpo-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 187 days.

(21) Appl. No.: 18/229,806

(22) Filed: Aug. 3, 2023

(65) Prior Publication Data

US 2024/0200387 A1 Jun. 20, 2024

(30) Foreign Application Priority Data

Dec. 14, 2022 (KR) .................. 10-2022-0175183

(51) Int. Cl.
*G06T 7/20* (2017.01)
*E05F 15/73* (2015.01)
*G06T 7/70* (2017.01)
*G06V 20/58* (2022.01)

(52) U.S. Cl.
CPC .................. *G06T 7/20* (2013.01); *G06T 7/70* (2017.01); *G06V 20/58* (2022.01); *E05F 2015/767* (2015.01); *E05Y 2400/45* (2013.01); *E05Y 2900/531* (2013.01); *G06T 2207/20081* (2013.01); *G06T 2207/30201* (2013.01); *G06T 2207/30252* (2013.01)

(58) Field of Classification Search
CPC ... G06T 7/20; G06T 7/70; G06T 2207/30201; G06T 2207/30252; G06V 20/58; E05F 2015/767; E05F 15/73; E05Y 2400/45; E05Y 2900/531; B60W 60/00253; B60W 40/02; B60W 50/0098; B60W 2540/041
See application file for complete search history.

(56) References Cited

U.S. PATENT DOCUMENTS

| | | | |
|---|---|---|---|
| 9,910,438 B1 * | 3/2018 | Arden | G05D 1/0088 |
| 10,579,788 B2 | 3/2020 | Dyer et al. | |
| 10,872,143 B2 | 12/2020 | Dyer et al. | |
| 11,024,139 B1 * | 6/2021 | Van Wiemeersch | B60R 25/1004 |
| 11,119,503 B2 | 9/2021 | Kim | |
| 11,188,741 B2 | 11/2021 | Kang et al. | |
| 11,475,119 B2 | 10/2022 | Dyer et al. | |
| 2019/0225232 A1 * | 7/2019 | Blau | G05D 1/0088 |
| 2020/0012295 A1 | 1/2020 | Kim | |
| 2020/0019761 A1 | 1/2020 | Kang et al. | |
| 2020/0327317 A1 | 10/2020 | Park | |

(Continued)

FOREIGN PATENT DOCUMENTS

| | | |
|---|---|---|
| KR | 10-2019-0106845 A | 9/2019 |
| KR | 10-2020-0121394 A | 10/2020 |

(Continued)

*Primary Examiner* — Ig T An
(74) *Attorney, Agent, or Firm* — Banner & Witcoff, Ltd.

(57) ABSTRACT

Disclosed is an autonomous vehicle control apparatus including a sensor that obtains sensing information associated with an entity around a vehicle, a camera that obtains an image of the entity, and one or more processor that determine whether the entity is estimated to reach the vehicle at least a predetermined time after a door of the vehicle opens, and control a position of the door.

20 Claims, 14 Drawing Sheets

(56) References Cited

U.S. PATENT DOCUMENTS

| | | | |
|---|---|---|---|
| 2020/0338981 A1* | 10/2020 | Moon | G05D 1/0088 |
| 2021/0061224 A1 | 3/2021 | Kim et al. | |
| 2021/0171046 A1 | 6/2021 | Blott et al. | |
| 2022/0198196 A1* | 6/2022 | Beaurepaire | G06V 40/103 |

FOREIGN PATENT DOCUMENTS

| | | | |
|---|---|---|---|
| KR | 102164188 B1 | 10/2020 |
| KR | 102315335 B1 | 10/2021 |
| KR | 102382117 B1 | 4/2022 |

\* cited by examiner

| x [m] | y [m] | v_x [m/s] | v_y [m/s] | heading by v [deg] | heading by face [deg] | heading [deg] | ETA [s] | Result [bool] |
|---|---|---|---|---|---|---|---|---|
| 0.3 | -2 | 0 | 0 | 0 | 88.53076561 | 70.82461249 | 65535 | F |
| -0.2 | -1.6 | -0.139331076 | 0.62496948 | 141.3401917 | 92.87498365 | 102.5680253 | -1.435429952 | F |
| -0.6 | -1.2 | 0.323392149 | 1.159921341 | 138.3664607 | 58.43494882 | 74.42125119 | 1.034552911 | T |
| -0.8 | -0.9 | 0.248935289 | 0.718440131 | 133.6677801 | 55.19442891 | 70.88909916 | 1.252713985 | T |
| -0.9 | -0.7 | 0.356562075 | 0.454932398 | 127.2664019 | 33.07307332 | 51.91173903 | 1.494727575 | T |
| -0.8 | -0.6 | 0.204216014 | 0.266731737 | 104.6567511 | 39.53767779 | 52.56149246 | 2.061996841 | T |
| -0.6 | -0.3 | 0.24078789 | 0.161388326 | 75.00492087 | 23.53878226 | 33.83200998 | 2.106719911 | T |
| -0.4 | -0.1 | 0.33906118 | 0.161051285 | 48.2397003 | 19.69924423 | 25.40733545 | 0.745104269 | T |
| -0.2 | -0.1 | 0.357408848 | 0.126427511 | 41.2570117 | 14.03624347 | 19.48039712 | 0.395483542 | T |

FIG.6

| x [m] | y [m] | v_x [m/s] | v_y [m/s] | heading by v [deg] | heading by face [deg] | heading [deg] | ETA [s] | Result [bool] |
|---|---|---|---|---|---|---|---|---|
| -1.4 | -0.6 | 0 | 0 | 0 | -6.801409486 | -5.44112759 | 65535 | F |
| -1.2 | -0.5 | 0.197003284 | -0.124858745 | 30.96375653 | -48.19859051 | -32.3661211 | -3.84434427 | F |
| -0.8 | -0.3 | 0.427026169 | -0.54785824 | 30.25643716 | -72.64597536 | -52.0654929 | -0.456322424 | F |
| -0.4 | -0.2 | 0.180755305 | -0.5072746 | 21.80140949 | -93.43494882 | -70.3876772 | -0.394263777 | F |
| -0.1 | -0.4 | 0.072961121 | -0.546604679 | 4.159642294 | -104.0362435 | -82.3970663 | -0.731790297 | F |
| -0.3 | -0.6 | 0.132378811 | -0.555878449 | 344.2611986 | 268.1785901 | 283.3951118 | -1.007414482 | F |
| 0.45 | -0.6 | 0.00883876 | -0.476205708 | 333.1659565 | 255.5376778 | 271.0633335 | -1.322957683 | F |
| 0.5 | -0.8 | -0.069622916 | -0.353769204 | 326.3099325 | 242.0053832 | 258.8662931 | -2.261361337 | F |
| 0.5 | -0.9 | -0.095181027 | -0.148207868 | 304.5922887 | 220.4655449 | 237.2908937 | -5.253147758 | F |

FIG. 9

APPARATUS AND METHOD FOR CONTROLLING AUTONOMOUS VEHICLE

CROSS-REFERENCE TO RELATED APPLICATION

This application claims the benefit of priority to Korean Patent Application No. 10-2022-0175183, filed in the Korean Intellectual Property Office on Dec. 14, 2022, the entire contents of which are incorporated herein by reference.

TECHNICAL FIELD

The present disclosure relates to an apparatus and method for controlling an autonomous vehicle.

BACKGROUND

Nowadays, technologies for autonomous driving mobility such as a robo-taxi, a robo-shuttle, or the like, which are transport passengers to a destination by using autonomous vehicles, are being developed.

From a point of departure to a destination, the robo-shuttle allows passengers to get on and off the robo-shuttle at a predetermined stop, and allows a user to get on and off the robo-shuttle at a desired place. As such, there is a demand for a technology that controls vehicle doors by predicting, in advance, any threats to the safety of passengers as they get on and off a vehicle.

SUMMARY

The present disclosure has been made to solve the above-mentioned problems occurring in the prior art while advantages achieved by the prior art are maintained intact.

An aspect of the present disclosure provides an autonomous vehicle control apparatus and method for controlling a door of a vehicle when a passenger gets on and off the vehicle.

The technical problems to be solved by the present disclosure are not limited to the aforementioned problems, and any other technical problems not mentioned herein will be clearly understood from the following description by those skilled in the art to which the present disclosure pertains.

According to one or more example embodiments of the present disclosure, an autonomous vehicle control apparatus may include: a sensor configured to obtain sensing information associated with a first entity and a second entity around a vehicle; a camera configured to obtain an image of the first entity and an image of the second entity; one or more processors; and memory storing instructions. The instructions, when executed by the one or more processors, may cause the autonomous vehicle control apparatus to: determine, after the vehicle stops and based on the sensing information associated with the first entity and the image of the first entity, whether the entity is estimated to reach the vehicle after a predetermined time from a point in time when a door is to be opened; and based on the determination, control a position of the door, determine whether the second entity approaching the vehicle is estimated to board the vehicle, based on the sensing information of the second entity and the image of the second entity after causing the door open.

The instructions, when executed by the one or more processors, may cause the autonomous vehicle control apparatus to control the position of the door by causing the door to be closed based on a determination that the first entity is estimated to reach the vehicle after a predetermined time from a point in time when a door is to be opened.

The instructions, when executed by the one or more processors, may cause the autonomous vehicle control apparatus to control the position of the door by causing the door to be opened based on a determination that the first entity is estimated to not reach the vehicle after a predetermined time from a point in time when a door is to be opened.

The instructions, when executed by the one or more processors, may further cause the autonomous vehicle control apparatus to, after causing the door to open, determine whether a passenger of the vehicle gets on or off the vehicle.

The instructions, when executed by the one or more processors, may further cause the autonomous vehicle control apparatus to determine whether the second entity is present around the vehicle at a point in time when the passenger completely get off or on the vehicle when it is determined that the passenger gets off or on after causing the door to open.

The instructions, when executed by the one or more processors, may further cause the autonomous vehicle control apparatus to, based on determining that the second entity is not present around the vehicle at a point in time when the passenger completely get off or on the vehicle, output a notification that the door is scheduled to be closed.

The instructions, when executed by the one or more processors, may further cause the autonomous vehicle control apparatus to, after outputting the notification that the door is scheduled to be closed, determine whether the second entity is approaching the vehicle.

The instructions, when executed by the one or more processors, may further cause the autonomous vehicle control apparatus to, based on determining that the second entity is approaching the vehicle, determine whether the second entity is estimated to board the vehicle.

The instructions, when executed by the one or more processors, may cause the autonomous vehicle control apparatus to determine whether the second entity is estimated to board the vehicle based on a time required for the second entity to reach the vehicle.

The instructions, when executed by the one or more processors, may cause the autonomous vehicle control apparatus to determine whether the second entity is estimated to board the vehicle based on a boarding probability that the second entity will board the vehicle.

The instructions, when executed by the one or more processors, may cause the autonomous vehicle control apparatus to determine whether the second entity is estimated to board the vehicle based on an expected route of the second entity.

The instructions, when executed by the one or more processors, may cause the autonomous vehicle control apparatus to determine whether the second entity is estimated to board the vehicle based on at least one of: a moving direction of the second entity, a moving velocity of the second entity, or tracking data of the second entity.

The instructions, when executed by the one or more processors, may cause the autonomous vehicle control apparatus to determine whether the second entity is estimated to board the vehicle based on an average moving velocity of the second entity.

The instructions, when executed by the one or more processors, may cause the autonomous vehicle control apparatus to determine whether the second entity is estimated to board the vehicle based on at least one of: a face direction of the second entity or a gaze direction of the second entity, wherein the face direction of the gaze direction is determined based on an image of the second entity.

The instructions, when executed by the one or more processors, may cause the autonomous vehicle control apparatus to calculate the time required for the second entity to reach the vehicle, the boarding probability that the second entity will board the vehicle or the expected route of the second entity based on an artificial intelligence model inputted the sensing information.

The instructions, when executed by the one or more processors, may cause the autonomous vehicle control apparatus to perform learning through second artificial intelligence model by inputting an image of the second entity and pre-stored sensing information associated with the second entity and determine whether the second entity is estimated to board the vehicle, based on the learning result.

The instructions, when executed by the one or more processors, may cause the autonomous vehicle control apparatus to determine that the second entity is estimated to board the vehicle based on the time required for the second entity to reach the vehicle is less than or equal to a threshold time.

The instructions, when executed by the one or more processors, may cause the autonomous vehicle control apparatus to determine that the second entity is estimated to board the vehicle based on the boarding probability of the entity being greater than a threshold value.

The instructions, when executed by the one or more processors, may cause the autonomous vehicle control apparatus to allow the door to be opened based on determining that the second entity is estimated to board the vehicle.

According to one or more example embodiments of the present disclosure, an autonomous vehicle control method may include: obtaining sensing information associated with a first entity around a vehicle; obtaining an image of the first entity; determining, after the vehicle stops and based on the sensing information associated with the first entity and the image of the first entity, whether the first entity is estimated to reach the vehicle at least a predetermined time after a door of the vehicle opens; based on the determining whether the first entity is estimated to reach the vehicle, controlling a position of the door; after causing the door to open, determining whether a second entity approaching the vehicle is estimated to board the vehicle; and based on the determining whether the second entity is estimated to board the vehicle, controlling the position of the door.

BRIEF DESCRIPTION OF THE DRAWINGS

The above and other objects, features and advantages of the present disclosure will be more apparent from the following detailed description taken in conjunction with the accompanying drawings:

FIGS. 4, 5 and 6 are diagrams illustrating one or more example embodiments, in each of which it is determined that an entity boards a vehicle, and FIGS. 7, 8 and 9 are diagrams illustrating one or more example embodiments, in each of which it is determined that an entity does not board a vehicle;

DETAILED DESCRIPTION

Figure 1:
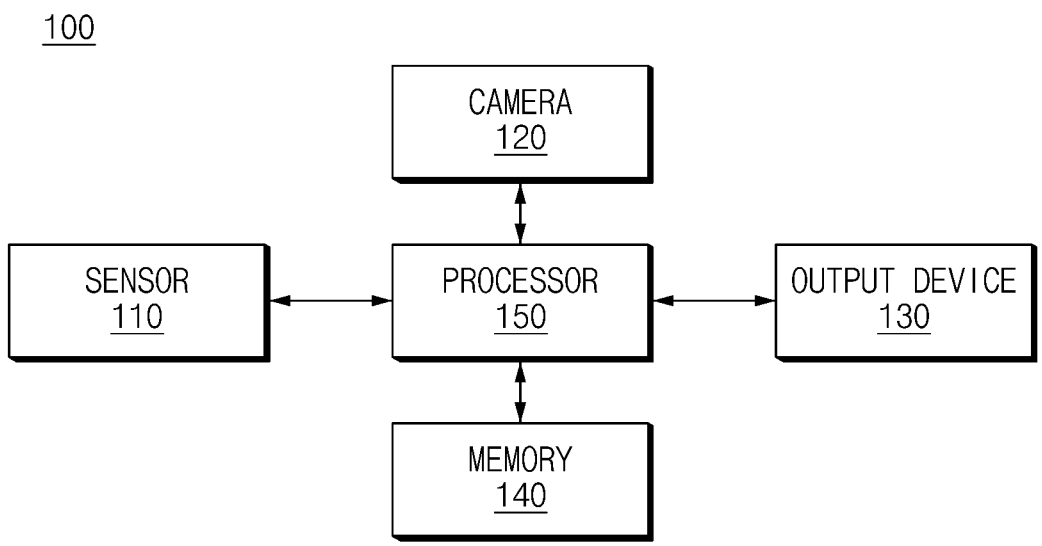
FIG. 1 is a diagram showing a configuration of an example autonomous vehicle control apparatus.

Hereinafter, one or more example embodiments of the present disclosure will be described in detail with reference to the accompanying drawings. In adding reference numerals to components of each drawing, it should be noted that the same components have the same reference numerals, although they are indicated on another drawing. Furthermore, in describing the one or more example embodiments of the present disclosure, detailed descriptions associated with well-known functions or configurations will be omitted when they may make subject matters of the present disclosure unnecessarily obscure.

In describing elements of one or more example embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of the present disclosure and the relevant art and will not be interpreted in an idealized or overly formal sense unless expressly so defined herein.

FIG. 1 is a diagram showing a configuration of an autonomous vehicle control apparatus.

As shown in FIG. 1, an autonomous vehicle control apparatus 100 may include a sensor 110, a camera 120, an output device 130, storage 140 and a processor 150.

The sensor 110 may obtain sensing information of an entity inside or outside a vehicle. The vehicle includes an autonomous vehicle. Here, the entity may refer to anything or anyone that can move, such as an object, an obstacle, a person, a passenger, an animal, or the like that may be found near and/or around the vehicle. Here, the passenger may include a passenger boarding inside a vehicle and a pedestrian walking around the vehicle. The sensor 110 may include an ultrasonic sensor, radar, LiDAR, or the like. The sensor 110 may obtain the position of an entity, the movement velocity of the entity, and the acceleration of the entity, and may obtain tracking data of the entity based on the position of the entity, the movement velocity of the entity, and the acceleration of the entity.

The camera 120 may be provided outside the vehicle to obtain an entity image. The camera 120 may obtain a face image of the passenger outside the vehicle and may obtain a face angle (an angle between a gaze direction of the passenger and a camera) of the passenger. The more detailed description is given with reference to FIG. 2.

Figure 2:
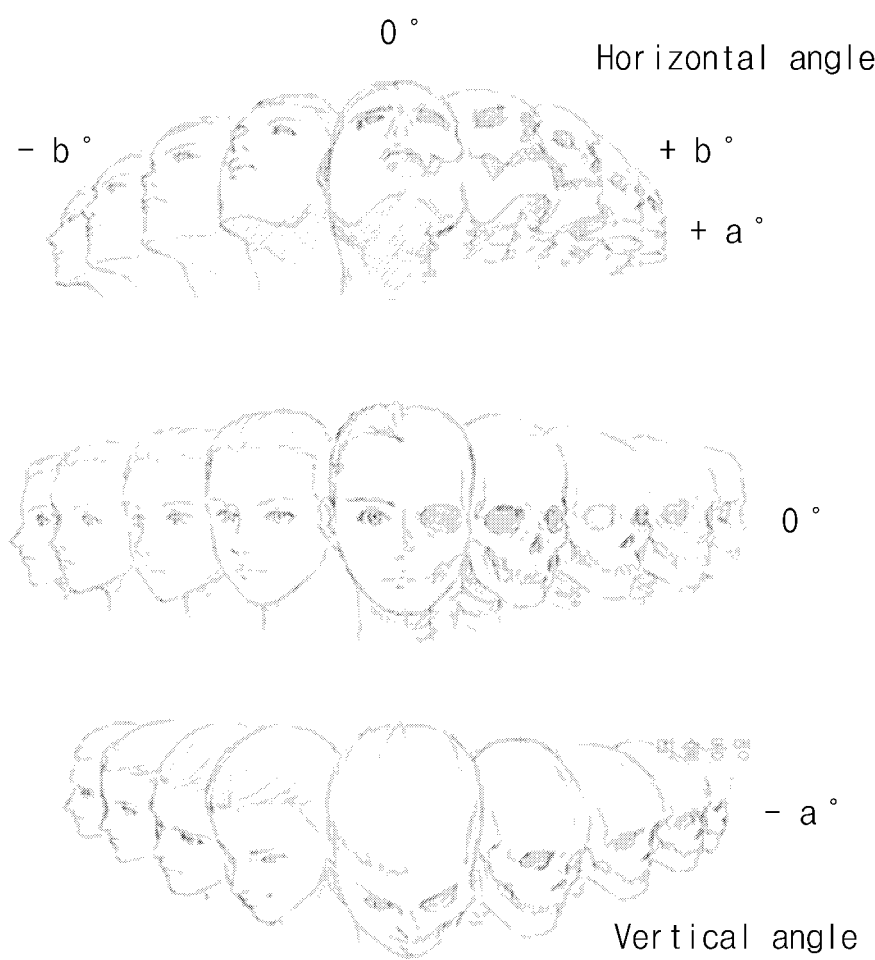
FIG. 2 is a diagram schematically illustrating an example face angle of a passenger obtained by a camera.

FIG. 2 is a diagram schematically illustrating a face angle of a passenger obtained by a camera.

As illustrated in FIG. 2, a diagram illustrates a face angle of a passenger in a horizontal direction (horizontal angle) and the face angle of the passenger in a vertical direction (vertical angle). If the face direction of a passenger corresponds to the traveling direction of a vehicle, the camera 120 may set a horizontal face angle to 0 degrees and may set a vertical face angle to 0 degrees. Besides, the camera 120 may obtain a face angle of the passenger in a range between +a degrees (upward angle) and −a degrees (downward angle) depending on an extent to which the passenger's face is oriented upwardly or downwardly based on the traveling direction of a vehicle. The camera 120 may obtain a face angle ranging from −b degrees (rightward angle) to +b degrees (leftward angle) depending on an extent to which the passenger's face is oriented horizontally to the right or left.

The output device 130 may be implemented with a display device or a sound output device. Here, the display device may include a display device provided separately inside or outside the vehicle. The sound output device may include a speaker separately provided inside or outside the vehicle.

The memory 140 may store at least one algorithm for performing calculation or execution of various commands for an operation of an autonomous vehicle control apparatus. The memory may store at least one instruction executed by the processor 150. The memory 140 may include at least one storage medium of a flash memory, a hard disk, a memory card, a read-only memory (ROM), a random access memory (RAM), an electrically erasable programmable read only memory (EEPROM), a programmable read-only memory (PROM), a magnetic memory, a magnetic disk, or an optical disc.

The processor 150 may be implemented by various processing devices such as a microprocessor equipped with a semiconductor chip capable of performing or executing various commands, and may control an operation of an autonomous vehicle control apparatus. The processor 150 may be electrically connected to the sensor 110, the camera 120, the output device 130, and the memory 140 through wired cables or various circuits to transmit electrical signals including control commands, and may transmit and receive the electrical signals including control commands through various wireless communication networks such as a controller area network (CAN).

The processor 150 may determine, after the vehicle stops, whether an entity is estimated to reach a vehicle (e.g., whether the entity will likely reach the vehicle, or whether the entity is expected to reach the vehicle) after a predetermined time from a point in time when a door is to be opened, and may control the opening or closing of the door depending on the determination result. After allowing the door to be opened, the processor 150 may determine whether the entity approaching the vehicle is capable of boarding (e.g., expected to board, projected to board, estimated to board) the vehicle, based on sensing information of the entity and the image of the entity, and may control the opening or closing of the door depending on the determination result.

Before allowing the door to be opened, the processor 150 may determine whether an entity is present around the vehicle, based on the sensing information of the entity. If there is an entity around the vehicle, the processor 150 may output a message for providing the inside of the vehicle and the outside of the vehicle with a notification that the vehicle door is about to open and may output a message for requesting movement (e.g., move away from the vehicle) of the entity outside the vehicle.

If there is no entity around the vehicle, before allowing the door to be opened, the processor 150 may determine whether the entity is present, once again and may obtain sensing information of the entity. The processor 150 may obtain a distance between an entity around the vehicle and the vehicle, and the moving velocity of the entity around the vehicle based on the sensing information. The processor 150 may determine whether the entity is estimated to reach the vehicle after a predetermined time from a point in time when a door is to be opened.

If it is determined that the entity is estimated to reach the vehicle after a predetermined time from a point in time when a door is to be opened, the processor 150 may predict that the entity is estimated to reach the vehicle and collide with a passenger at a point in time when the door of the vehicle is opened (e.g., the point in time when the door starts to open, or the point in time when the door opens completely) and then the passenger gets off. Accordingly, the processor 150 may allow the door to be closed.

In the meantime, if it is determined that the entity is estimated to not reach the vehicle after a predetermined time from a point in time when the door is to be opened, the processor 150 may predict that the entity will not likely reach the vehicle at a point in time when the door of the vehicle is opened and then the passenger gets off. Accordingly, the processor 150 may allow the door to be opened.

After allowing the door to be opened, the processor 150 may determine whether the passenger gets off or on the vehicle.

The processor 150 may allow the door to be opened. If it is determined that the passenger gets off or on the vehicle, the processor 150 may determine whether there is an entity around the vehicle at a point in time when the passenger gets off or on the vehicle. Here, the entity around the vehicle that is determined when the passenger completely getting off or on the vehicle may include a passenger that will board the vehicle, a passenger passing around the vehicle, and the mobility (a bicycle, an electric scooter, or the like) that the passenger rides on.

If there is an entity around the vehicle, the processor 150 may keep the door open, and may output a message for guiding the entity around the vehicle to move (move away from the vehicle).

If it is determined that there is no entity around the vehicle during a predetermined time, the processor 150 may output a message for providing a notification that the door is scheduled to be closed after a predetermined time from the determined time point.

If an information message, for providing a notification that the door is scheduled to be closed, is output, the processor 150 may determine whether an entity (e.g., passenger) approaching the vehicle is present, based on information obtained from one or more of the sensor 110 and the camera 120. Until the door is completely closed after the boarding of the entity is completed, the processor 150 may determine whether an entity approaching the vehicle is present.

If it is determined that there is an entity approaching the vehicle, the processor 150 may determine whether the entity is capable of boarding the vehicle, based on information obtained from one or more of the sensor 110 and the camera 120.

The processor 150 may calculate a time (e.g., an estimated time) required for the entity to reach the vehicle and may determine whether the entity is capable of boarding the vehicle, based on the calculated time. Because sensing information is capable of being continuously changed until the entity completes boarding the vehicle, the processor 150 may repeatedly calculate and update the time (e.g., an estimated time) required to reach the vehicle until the entity determined as an entity approaching the vehicle completely boards the vehicle.

The processor 150 may calculate the time (e.g., an estimated time) required for the passenger to reach the vehicle based on the sensing information including a moving direction of an entity, a moving velocity of the entity, and tracking data of the entity, which are obtained through the sensor 110. The processor 150 may calculate the moving direction of the entity based on at least one of a face direction of the entity, a gaze direction of the entity, or any combination thereof, which is obtained based on an image of the entity. In particular, the processor 150 may obtain the heading angle of the entity based on at least one of the image of the entity or the sensing information of the entity. The processor 150 may calculate a time (e.g., an estimated time) required for the passenger to reach the vehicle by using the obtained heading angle.

For example, the processor 150 may calculate a first heading angle from Equation 1 and Equation 2 using the horizontal angle of a passenger, which is obtained based on a passenger image (in Equation 1 and Equation 2 (y, x) is a position of a passenger).

$$\text{heading angle}_{face}[\text{rad}] = \arctan2(y, x) + \text{Horizontal Angle}[\text{rad}] + \pi \quad \text{[Equation 1]}$$

(if, $x < 0$ and Horizontal Angle $< 0$)

$$\text{heading angle}_{face}[\text{rad}] = \arctan2(x, y) + \text{Horizontal Angle}[\text{rad}] - \pi \quad \text{[Equation 2]}$$

(if not, $x < 0$ and Horizontal Angle $< 0$)

Figure 3:
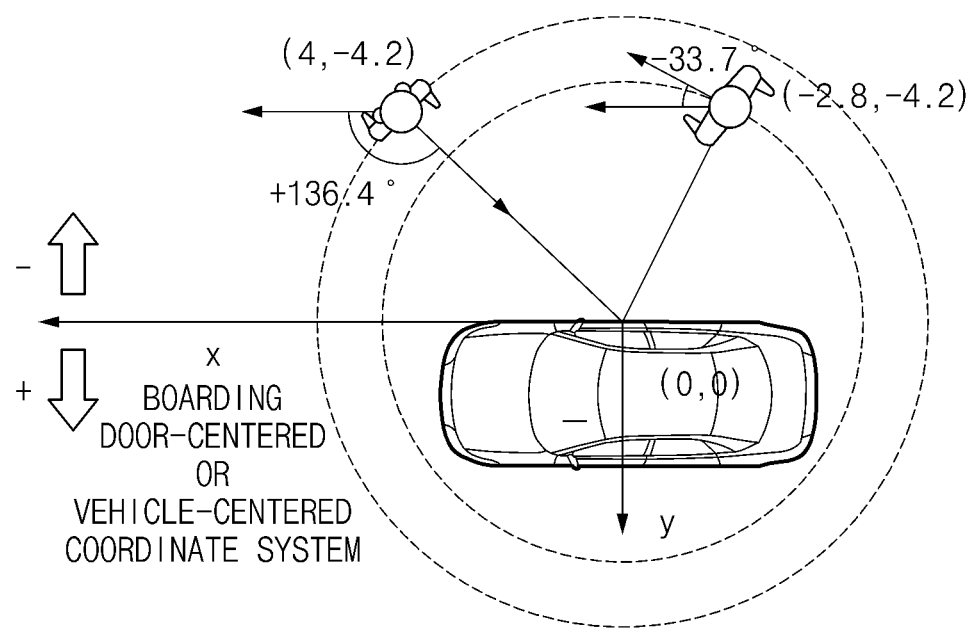
FIG. 3 is a diagram schematically illustrating an example method of calculating a first heading angle based on an image of an entity.

The more detailed description is given with reference to FIG. 3.

FIG. 3 is a diagram schematically illustrating a method of calculating a first heading angle based on an image of an entity.

As shown in FIG. 3, if a left front seat corresponds to a driver seat based on a traveling direction of a vehicle, the processor 150 may determine that an entity is present in a section where "y<0" (i.e., a right direction of the vehicle). Accordingly, the processor 150 may obtain a horizontal angle of the entity in a section where "y<0" and may calculate a first heading angle.

For another example, the processor 150 may calculate a second heading angle by using a velocity vector based on sensing information (moving velocity) of the entity.

The processor 150 may assign weights to the first heading angle and the second heading angle and may calculate a heading angle (e.g., an estimated heading angle) for calculating the time required for the entity to reach the vehicle. The processor 150 may calculate the heading angle by using Equation 3.

Heading angle = [Equation 3]

(first heading angle $* A$) + (second heading angle $* (1 - A)$)

(Here, $0 < A < 1$)

The processor 150 may calculate a time (e.g., an estimated time) required for a passenger to reach the vehicle by using the heading angle calculated by using Equation 3.

The processor 150 may calculate an average moving velocity of the entity based on the sensing information of the entity, and may calculate a time (e.g., estimated time of arrival (ETA)) required for the entity to reach the vehicle based on the average moving velocity (see Equation 4).

Estimated time of Arrival (ETA) = relative position from [Equation 4]

vehicle to pedestrian / average velocity of pedestrian (Here, relative position from vehicle to pedestrian = position of vehicle − position of passenger)

The processor 150 may input pre-stored image of an entity and pre-stored sensing information of the entity, may learn through a first artificial intelligence model by matching the input information with the calculated time, which is required to reach the vehicle at the heading angle and which is obtained based on one or more of the pre-stored image of the entity and the pre-stored sensing information of the entity, and may calculate the time required for the entity to reach the vehicle based on the first artificial intelligence model after the image of the entity is obtained through the camera 120 and the sensing information of the entity is obtained through the sensor 110. Here, the first artificial intelligence model may include a learning model for calculating the time required for an entity to reach a vehicle. After the time required for the entity to reach the vehicle is calculated, the processor 150 may determine whether the entity is capable of boarding the vehicle.

The processor 150 may compare a threshold time (a time from point in time when an information message for providing a notification that a door is scheduled to be closed is output to a point in time when the door starts to be closed) with a time required for the entity to reach the vehicle and may determine whether boarding is possible, based on the comparison result.

For example, if the time (e.g., an estimated time) required for the entity to reach the vehicle is not greater than the threshold time (a time from point in time when an information message for providing a notification that a door is scheduled to be closed is output to a point in time when the door starts to be closed), the processor 150 may determine that the entity is capable of boarding the vehicle.

In the meantime, if the time required for the entity to reach the vehicle exceeds the threshold time, the processor 150 may determine that the entity is incapable of boarding the vehicle.

Even if the entity is unable to approach the vehicle directly due to an obstacle and returns to avoid the obstacle, the processor 150 may determine whether the entity is capable of boarding the vehicle. Even if an entity is in close proximity to the vehicle and then an entity passes by the vehicle due to the obstacle, the processor 150 may determine whether the entity is capable of boarding the vehicle. The more detailed description is given with reference to FIGS. 4 to 9.

Figure 4:
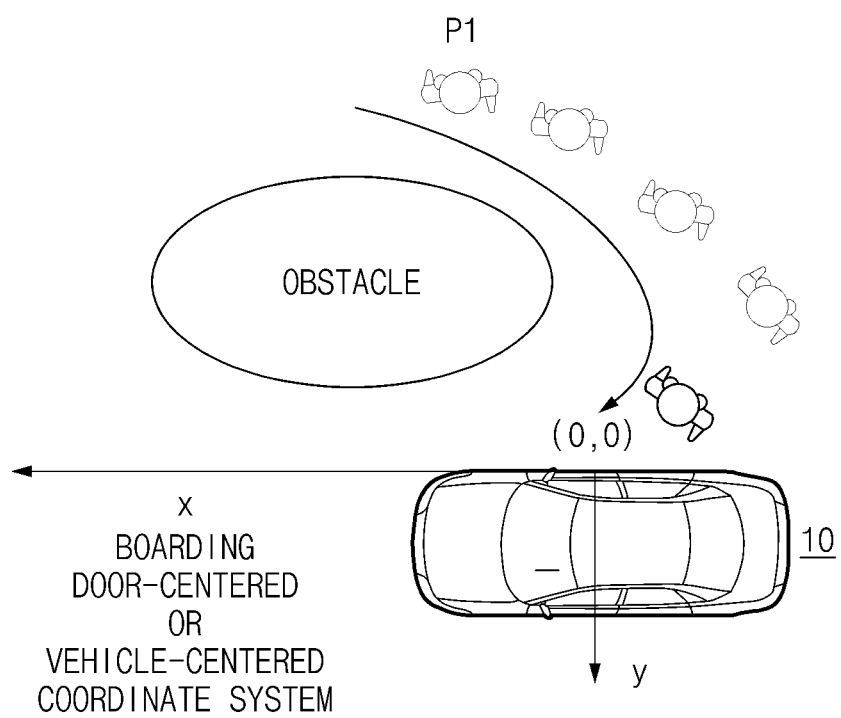
Figure 5:
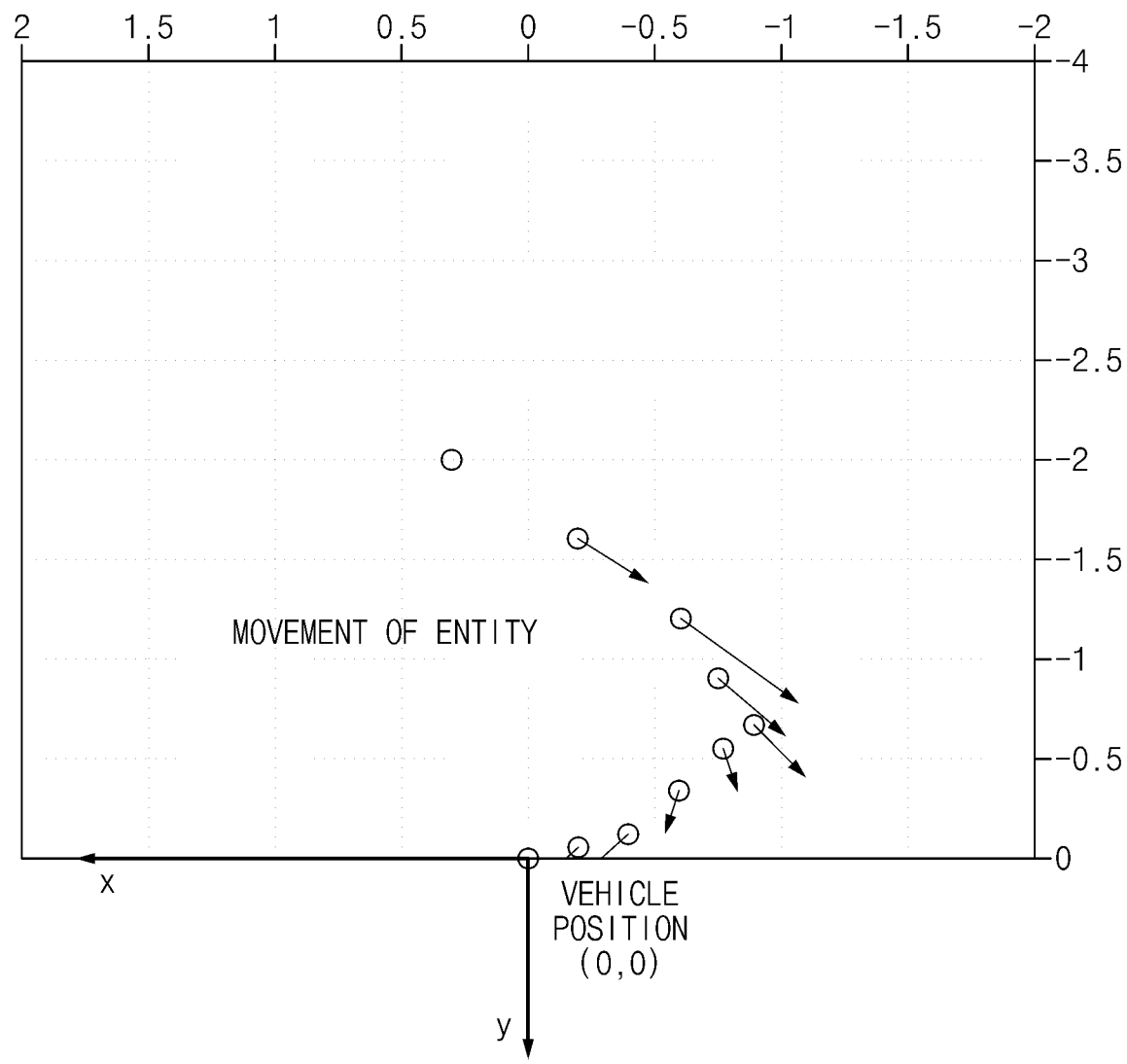
Figure 7:
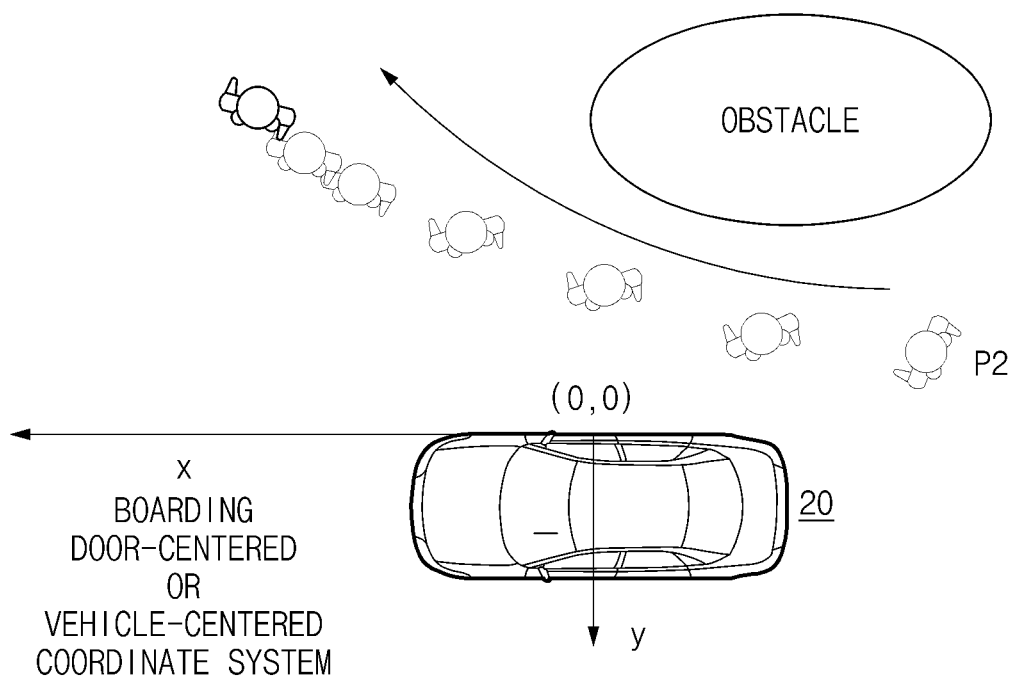
Figure 8:
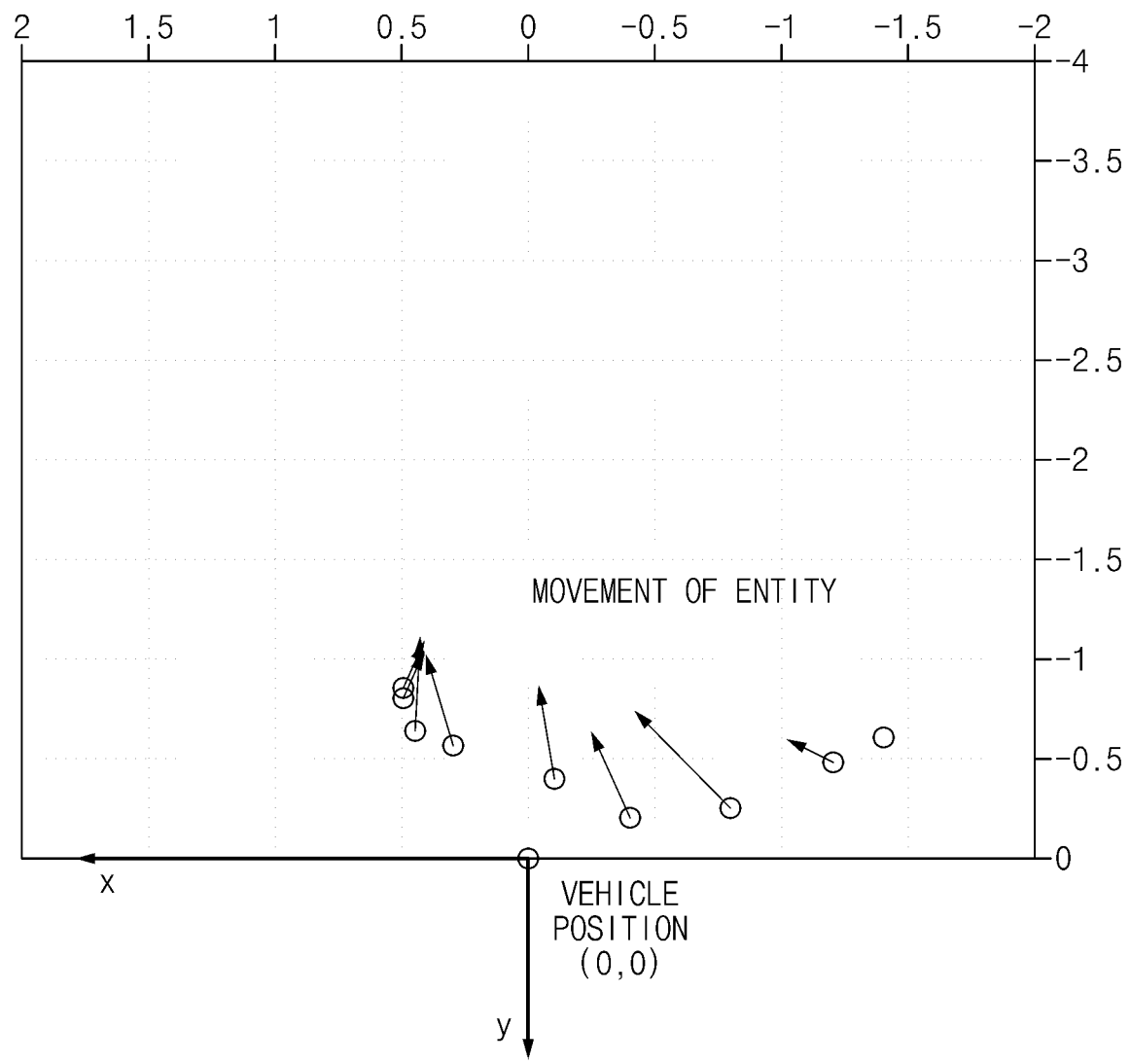

FIGS. 4, 5 and 6 are diagrams illustrating one or more example embodiments, in each of which it is determined that an entity boards a vehicle, according to an embodiment of the present disclosure. FIGS. 7, 8 and 9 are diagrams illustrating one or more example embodiments, in each of which it is determined that an entity does not board a vehicle.

As illustrated in FIGS. 4 to 6, if the processor 150 determines that there is an entity P1 approaching a vehicle 10 (FIG. 4), after a message indicating that a door is scheduled to be closed after a threshold time is displayed, the processor 150 may obtain tracking data of the entity P1, may track a position change according to the movement of the entity P1 based on a vehicle center (0, 0), and may indicate the tracked position as coordinates (FIG. 5).

The processor 150 may obtain a first heading angle calculated based on position coordinates of the entity, the moving velocity (x-axis direction moving velocity and y-axis direction moving velocity), and the image of the entity and may obtain the calculated second heading angle by using the velocity vector. The processor 150 may calculate a time (e.g., an estimated time) required for the entity to reach the vehicle by using the calculated heading angle based on Equation 2 by applying weights to the first heading angle and the second heading angle. Accordingly, the processor 150 calculates the time required for the entity to reach the vehicle to be less than or equal to a threshold time even in a section where the entity returns while avoiding an obstacle such that it is determined that a passenger is capable of boarding the vehicle (T).

As illustrated in FIGS. 7 to 9, if the processor 150 determines that there is an entity P2 approaching a vehicle 20 (FIG. 7), after a message indicating that a door is scheduled to be closed after a threshold time is displayed, the processor 150 may obtain tracking data of the entity P2, may track a position change according to the movement of the entity P2 based on a vehicle center (0, 0), and may indicate the tracked position as coordinates (FIG. 8).

The processor 150 may obtain a first heading angle calculated based on position coordinates of the entity, the moving velocity (x-axis direction moving velocity and y-axis direction moving velocity), and the image of the entity and may obtain the calculated second heading angle by using the velocity vector. The processor 150 may calculate a time required for the entity to reach the vehicle by using the calculated heading angle based on Equation 2 by applying weights to the first heading angle and the second heading angle. Accordingly, the processor 150 may determine that the passenger has passed the vehicle, by calculating a time required for the entity to reach the vehicle as a negative number even in a section where the entity approaches the vehicle while avoiding the obstacle, and may determine that the passenger is incapable of boarding the vehicle (F) (FIG. 9).

If there is an entity approaching the vehicle, the processor 150 may calculate the boarding probability of the entity based on sensing information including the moving direction of the entity, the moving velocity of the entity, and tracking data of the entity, which are obtained through the sensor 110, for the purpose of determining whether an entity is capable of boarding the vehicle. Moreover, the processor 150 may calculate the boarding probability based on the average moving velocity of the entity calculated based on the sensing information of the entity.

If the probability that the entity boards the vehicle exceeds a threshold value, the processor 150 may determine that the entity is capable of boarding the vehicle. If the probability that the entity boards the vehicle is not greater than the threshold value, the processor 150 may determine that the entity is incapable of boarding the vehicle.

If there is an entity approaching the vehicle, the processor 150 may learn the probability that the entity boards the vehicle, by inputting the pre-stored image of the entity and the pre-stored sensing information of the entity to the second artificial intelligence model, for the purpose of determining whether an entity is capable of boarding the vehicle. If the image of an entity is obtained through the camera 120 and the sensing information of the entity is obtained through the sensor 110, the processor 150 may calculate the boarding probability of the entity based on the second artificial intelligence model. Here, the second artificial intelligence model may include a learning model for calculating the boarding probability.

The processor 150 may calculate the expected route of an entity and may determine whether the entity is capable of boarding the vehicle, based on the expected route. The processor 150 may calculate the expected route based on sensing information including the moving direction of the entity, the moving velocity of the entity, and the tracking data of the entity. Furthermore, the processor 150 may calculate the expected route based on the average moving velocity of the entity calculated based on the sensing information of the entity.

The processor 150 may learn the expected route through a third artificial intelligence model by inputting pre-stored entity image and pre-stored sensing information of the entity. If the image of an entity is obtained through the camera 120 and the sensing information of the entity is obtained through the sensor 110, the processor 150 may calculate the expected route based on the third artificial intelligence model. Here, the third artificial intelligence model may include a learning model for calculating the expected route.

The processor 150 may perform learning by using a fourth artificial intelligence model that takes the pre-stored image of the entity and pre-stored sensing information of the entity as inputs, and may determine whether the entity approaching the vehicle is capable of boarding the vehicle, based on the learned result.

If the processor 150 determines that an entity approaching the vehicle is capable of boarding the vehicle, the processor 150 may allow the door of the vehicle to be opened until the entity is boarded. The processor 150 may determine that the entity is capable of boarding the vehicle. Accordingly, while keeping the door open, the processor 150 may determine again whether there is another entity approaching the vehicle. The more detailed description is given with reference to FIGS. 10 and 11.

Figure 10:
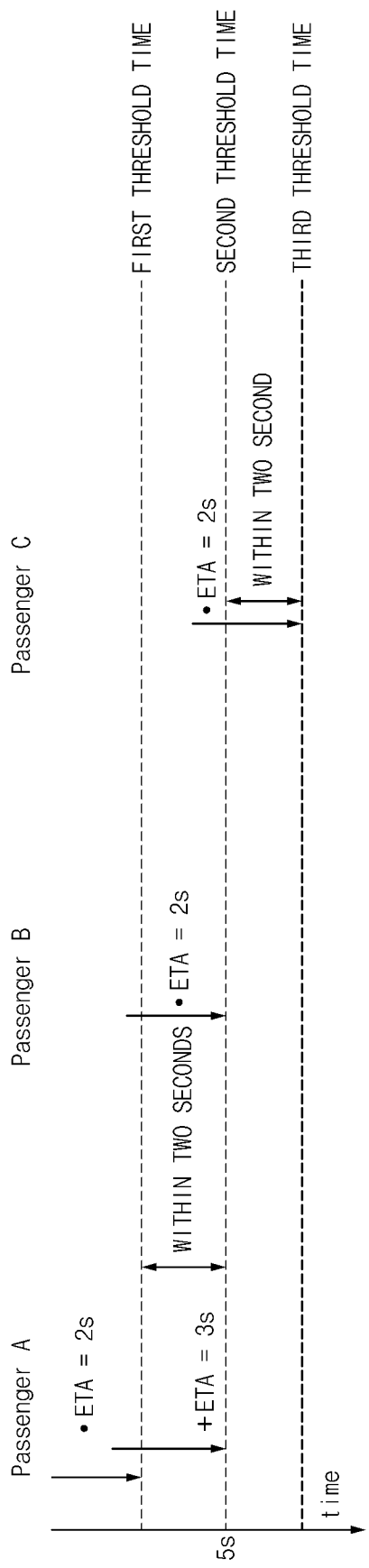
FIGS. 10 and 11 are diagrams schematically illustrating an example operation of additionally identifying whether an entity is present.
Figure 11:
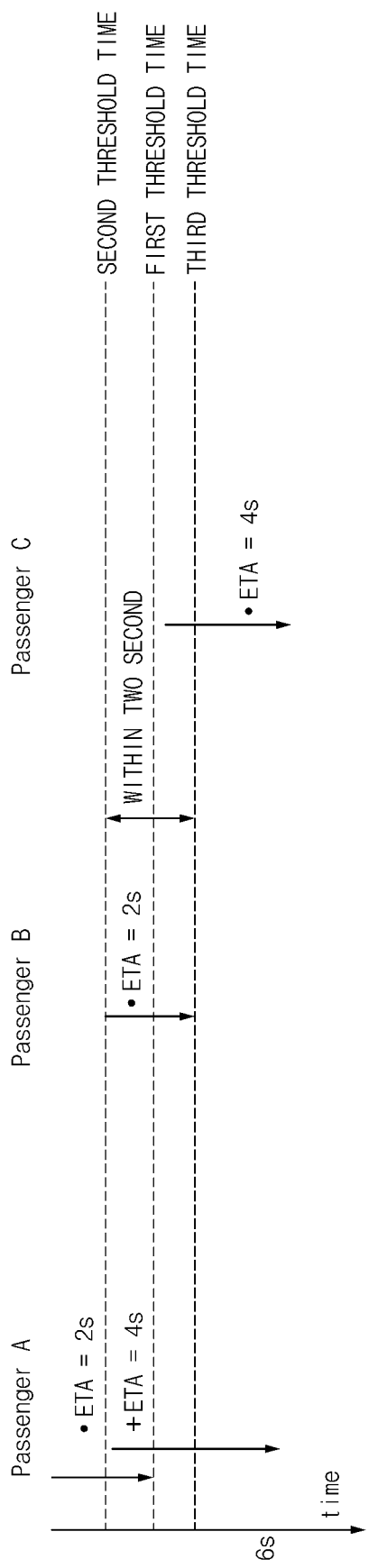

FIGS. 10 and 11 are diagrams schematically illustrating an operation of additionally identifying whether an entity is present.

As shown in FIG. 10, the processor 150 may calculate a time (e.g., an estimated time) required for passenger A to reach the vehicle as 2 seconds. If a threshold time (for convenience of description, it is referred to as a "first threshold time") is set to 2 seconds, the processor 150 may determine that passenger 'A' is boardable, and may allow a door to be opened. If the time required to reach the vehicle is updated to 3 seconds based on the sensing information, the processor 150 may set a second threshold time by changing a first threshold time based on the updated time.

The processor 150 may set a time interval between the first threshold time and the second threshold time. The processor 150 may set the time interval differently depending on a design. For example, the time interval may be set to 2 seconds. Accordingly, even if a time required for passenger A to reach the vehicle is updated, the processor 150 may determine that passenger A is a boardable passenger.

While the door is opened, the processor 150 may determine whether an additional passenger approaching the vehicle is present. If the processor 150 determines that passenger B is present, the processor 150 may calculate a time required for passenger B to reach the vehicle.

Besides, if it is determined that the vehicle is capable of being reached within a second threshold time, based on a time required for passenger B to reach the vehicle, the processor 150 may determine that passenger B is a boardable passenger.

Moreover, while the door is opened, the processor 150 may determine whether an additional passenger approaching the vehicle is present. If the processor 150 determines that passenger C is present, the processor 150 may calculate a time required for passenger C to reach the vehicle.

Furthermore, the processor 150 may set a third threshold time by extending the second threshold time by reflecting a time required for passenger C to reach the vehicle. A time interval between the second threshold time and the third threshold time may be set differently depending on a design. For example, the time interval may be set to 2 seconds. Accordingly, the processor 150 may determine that passenger C is a boardable passenger.

As shown in FIG. 11, the processor 150 may calculate a time required for passenger A to reach the vehicle as 2 seconds. If a threshold time (for convenience of description, it is referred to as a "first threshold time") is set to 2 seconds, the processor 150 may determine that passenger 'A' is boardable, and may allow a door to be opened. If the time required to reach the vehicle is updated to 4 seconds based on the sensing information, the processor 150 may set the second threshold time by changing the first threshold time based on the updated time. However, if a time interval between the first threshold time and the set second threshold time exceeds a time interval set depending on the design, the processor 150 may determine that it takes a lot of time for passenger A to reach the vehicle, and thus may determine that it is impossible to wait while the door is opened. Accordingly, the processor 150 may determine that passenger A is incapable of boarding the vehicle.

If it is determined that passenger A is incapable of boarding the vehicle, the processor 150 may allow the door to be closed at the second threshold time by advancing the first threshold time at which a door is closed. That is, because the processor 150 determines that there is no passenger other than passenger A to board the vehicle, the processor 150 may determine that there is no need to keep the door open during the first threshold time and may keep the door open only during the second threshold time.

Even at a point in time when the second threshold time elapses and the door starts to be closed, the processor 150 may determine whether an additional passenger is present. If it is determined that passenger B is present, the processor 150 may calculate a time required for passenger B to reach the vehicle.

Furthermore, the processor 150 may extend the second threshold time by reflecting a time required for passenger B to reach the vehicle, and may set the third threshold time. A time interval between the second threshold time and the third threshold time may be set differently depending on a design. For example, the time interval may be set to 2 seconds. Accordingly, the processor 150 may determine that passenger B is a boardable passenger.

While the door is opened, the processor 150 may determine whether an additional passenger approaching the vehicle is present. If the processor 150 determines that passenger C is present, the processor 150 may calculate a time required for passenger C to reach the vehicle.

The processor 150 may calculate a time required for passenger C to reach a vehicle as 4 seconds and may set a fourth threshold time by extending the third threshold time by reflecting a time required for passenger C to reach the vehicle. However, if a time interval between the third threshold time and the set fourth threshold time exceeds a time interval set depending on the design, the processor 150 may determine that it takes a lot of time for passenger C to reach the vehicle, and thus may determine that it is impossible to wait while the door is opened. Accordingly, the processor 150 may determine that passenger C is incapable of boarding the vehicle. In the meantime, the processor 150 may determine that an entity approaching a vehicle is incapable of boarding the vehicle. If it is determined that an additional entity approaching the vehicle is not present at a point in time when a door starts to be closed, the processor 150 may allow the door to be closed.

Figure 12:
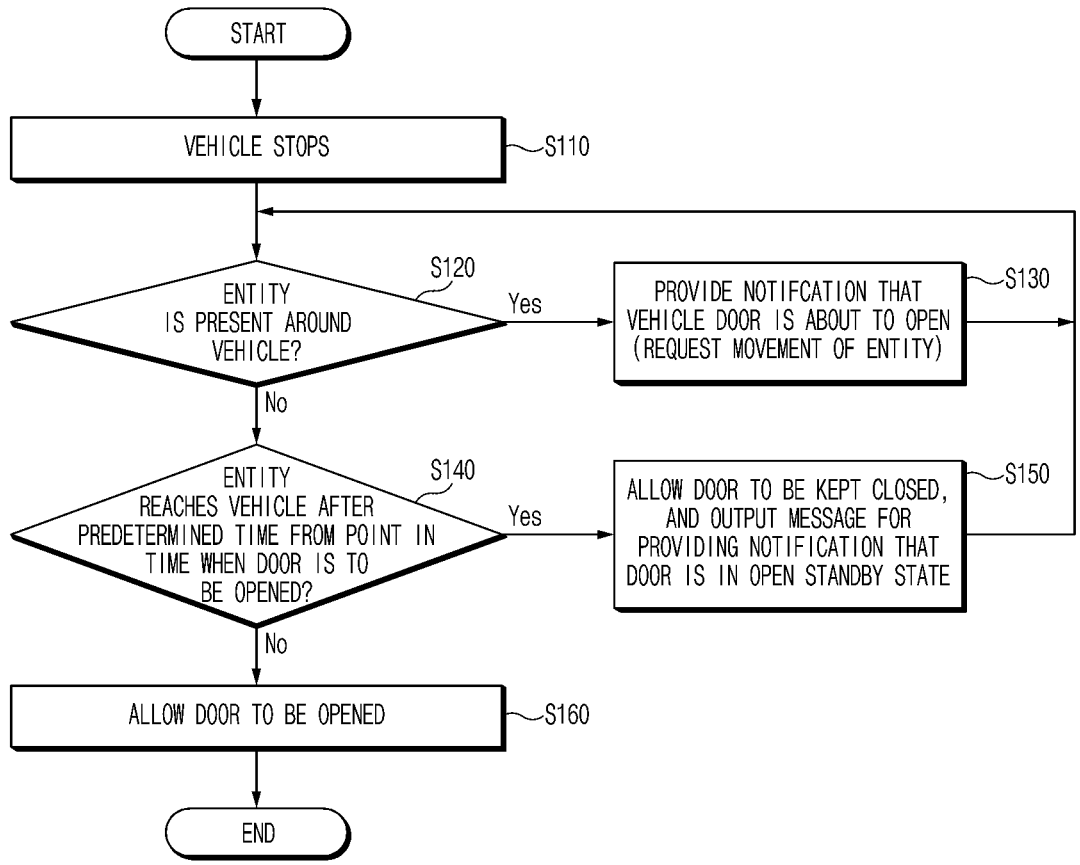
FIGS. 12 and 13 are flowcharts illustrating an example vehicle control method.
Figure 13:
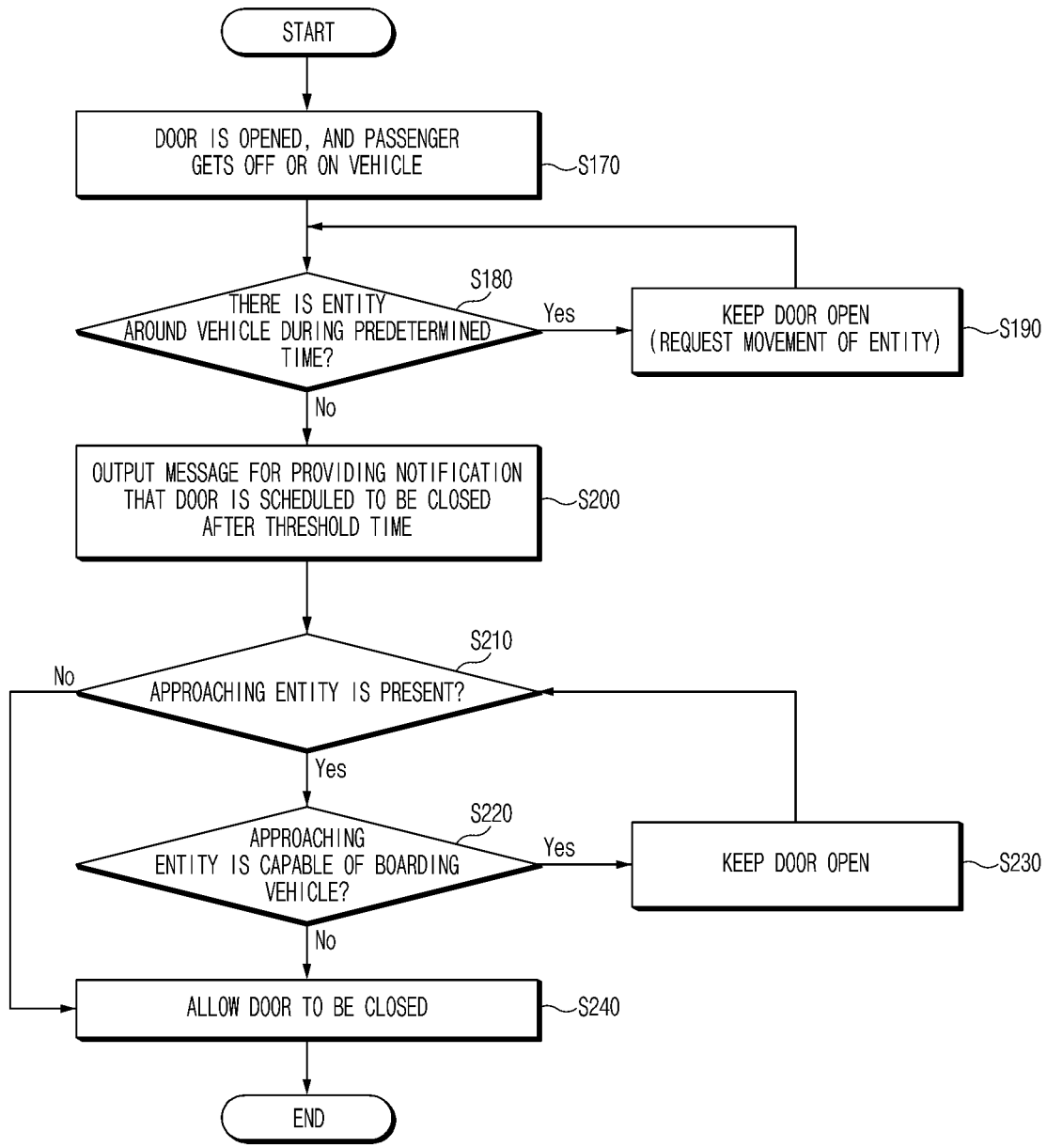

FIGS. 12 and 13 are diagrams illustrating an example vehicle control method.

As shown in FIG. 12, if the processor 150 determines that a vehicle stops (S110), the processor 150 may determine whether an entity is present around the vehicle, based on sensing information of the entity before allowing the door to be opened (S120).

After determining whether an entity is present around the vehicle, the processor 150 may output a message for providing the inside of the vehicle and the outside of the vehicle with a notification that a vehicle door is about to open and may output a message for requesting movement (moving away from the vehicle) of the entity outside the vehicle (S130).

If it is determined that there is no entity around the vehicle, before allowing the door to be opened, the processor 150 may determine whether the entity is present, once again and may obtain the sensing information of the entity. The processor 150 may obtain a distance between an entity around the vehicle and the vehicle, and the moving velocity of the entity around the vehicle based on the sensing information of an entity. The processor 150 may determine whether the entity is estimated (e.g., expected, projected) to reach the vehicle after a predetermined time from a point in time when a door is to be opened (S140).

If it is determined in S140 that the entity is estimated (e.g., expected, projected) to reach the vehicle after a predetermined time from a point in time when a door is to be opened, the processor 150 may predict that the entity will likely reach the vehicle and collide with a passenger at a point in time when the door of the vehicle is opened and then the passenger gets off. Accordingly, the processor 150 may allow the door to be closed.

In S150, the processor 150 may output a message for providing a notification that the vehicle door is in an open standby state, while allowing the door to be closed.

In the meantime, if it is determined in S140 that the entity is estimated (e.g., expected, projected) to not reach the vehicle after a predetermined time from a point in time when the door is to be opened, the processor 150 may predict that the entity will not likely reach the vehicle at a point in time when the door of the vehicle is opened and then the passenger gets off. Accordingly, the processor 150 may allow the door to be opened (S160).

As illustrated in FIG. 13, after allowing the door to be opened, the processor 150 may determine whether the passenger gets off or on the vehicle (S170).

The processor 150 may allow the door to be opened. If it is determined that the passenger gets off or on the vehicle, the processor 150 may determine whether there is an entity around the vehicle, during a predetermined time from a point in time when the passenger completely gets off or on the vehicle (S180).

If it is determined in S180 that there is an entity around the vehicle during a predetermined time, the processor 150 may keep the door open, and may output a message for guiding the entity around the vehicle to move (move away from the vehicle) (S190).

If it is determined that there is no entity around the vehicle during a predetermined time, the processor 150 may output a message for providing a notification that the door is scheduled to be closed after a threshold time (S200).

After the information message, for providing a notification that the door is scheduled to be closed, is output, the processor 150 may determine whether an entity approaching the vehicle is present, based on information obtained from one or more of the sensor 110 and the camera 120 (S210).

If it is determined in S210 that the entity approaching the vehicle is not present, the processor 150 may allow the door to be closed (S240).

If it is determined that there is an entity approaching the vehicle, the processor 150 may obtain tracking data of the entity from one or more of the sensor 110 and the camera 120 and may determine whether the entity is capable of boarding the vehicle, based on the obtained information (S220). In S220, the processor 150 may calculate a time required for the entity to reach the vehicle and may determine whether the entity is capable of boarding the vehicle, based on the calculated time. The processor 150 may calculate a time required for the entity to reach the vehicle by using a heading angle calculated through Equation 3 or may calculate the time required for the entity to reach the vehicle by using Equation 4. The processor 150 may calculate the time required for the entity to reach the vehicle based on a first artificial intelligence model.

In S220, the processor 150 may calculate the boarding probability of the entity and may determine whether the entity is capable of boarding the vehicle, based on the boarding probability. The processor 150 may calculate the boarding probability based on sensing information including the moving direction of the entity, the moving velocity of the entity, and the tracking data of the entity. Moreover, the processor 150 may calculate the boarding probability based on the average moving velocity of the entity calculated based on the sensing information of the entity. The processor 150 may input a pre-stored entity image of the entity and pre-stored sensing information of the entity, may calculate the boarding probability of the entity through the result learned by using the second artificial intelligence model, and may determine whether the entity is capable of boarding the vehicle, based on the boarding probability of the entity.

In S220, the processor 150 may calculate an expected route of the entity and may determine whether the entity is capable of boarding the vehicle, based on the expected route. The processor 150 may calculate the expected route based on sensing information including the moving direction of the entity, the moving velocity of the entity, and the tracking data of the entity. Furthermore, the processor 150 may calculate the expected route based on the average moving velocity of the entity calculated based on the sensing information of the entity. The processor 150 may calculate the expected route of the entity through a result learned by using a third artificial intelligence model and may determine whether the entity is capable of boarding the vehicle, based on the expected route.

In S220, the processor 150 may perform learning by using a fourth artificial intelligence model that takes the pre-stored image of the entity and pre-stored sensing information of the entity as inputs, and may determine whether the entity approaching the vehicle is capable of boarding the vehicle, based on the learned result.

If the time required for the entity to reach the vehicle is not greater than a threshold time, or if the boarding probability of the entity exceeds a threshold value, in S220, the processor 150 may determine that the entity is capable of boarding the vehicle.

If the processor 150 determines that an entity approaching the vehicle is capable of boarding the vehicle, the processor 150 may allow the door of the vehicle to be opened until the entity is boarded (S230).

While the door is opened in S230, the processor 150 may determine whether there is an entity approaching the vehicle, again (S210). If it is determined that there is an additional entity approaching the vehicle while the door is opened, the processor 150 may calculate a time required for the additional entity to reach the vehicle, and may determine that the additional entity is capable of boarding the vehicle, by changing a threshold time based on the calculated time.

Moreover, if the time it required for an entity to reach the vehicle is updated while the door is opened in S230, the processor 150 may determine that an entity, for which the time required to reach the vehicle is updated, is capable of boarding the vehicle, by changing the threshold time based on the updated time.

In the meantime, if the time required for the entity to reach the vehicle is greater than the threshold time, or if the boarding probability of the entity is not greater than the threshold value, in S220, the processor 150 may determine that the entity is incapable of boarding the vehicle.

The processor 150 may determine that an entity approaching a vehicle is incapable of boarding the vehicle. If it is determined that an additional entity approaching the vehicle is not present at a point in time when a door starts to be closed, the processor 150 may allow the door to be closed (S240).

In S240, until the door is completely closed, the processor 150 may continuously determine whether an entity approaching the vehicle is present. If it is determined that there is an additional entity approaching the vehicle at a point in time when a door starts to be closed, the processor 150 may calculate a time required for the additional entity to reach the vehicle, and may determine that the additional entity is capable of boarding the vehicle, by updating a threshold time based on the calculated time.

Figure 14:
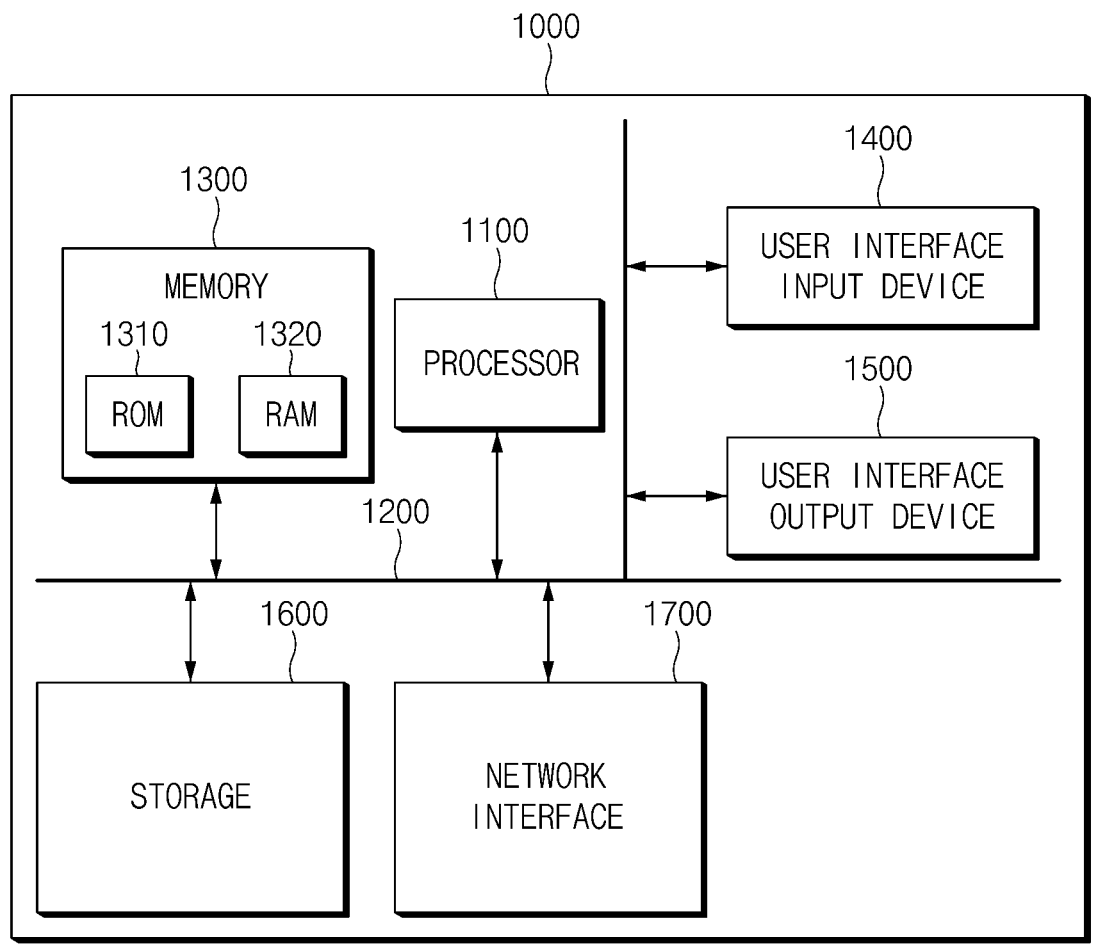
FIG. 14 is a block diagram illustrating an example configuration of a computing system performing a method.

FIG. 14 is a block diagram illustrating a configuration of a computing system performing a method.

Referring to FIG. 14, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the method or algorithm described in connection with one or more example embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The above description is merely an example of the technical idea of the present disclosure, and various modifications and modifications may be made by one skilled in the art without departing from the essential characteristic of the present disclosure.

Accordingly, one or more example embodiments of the present disclosure are intended not to limit but to explain the technical idea of the present disclosure, and the scope and spirit of the present disclosure is not limited by the above example embodiments. The scope of protection of the present disclosure should be construed by the attached claims, and all equivalents thereof should be construed as being included within the scope of the present disclosure.

A vehicle control system and method may control a door of a vehicle when a passenger gets on and off the vehicle such that the passenger safely gets on or off the vehicle.

Hereinabove, although the present disclosure has been described with reference to one or more example embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An autonomous vehicle control apparatus comprising:
   a sensor configured to obtain sensing information associated with a first entity and a second entity around a vehicle;
   a camera configured to obtain an image of the first entity and an image of the second entity;
   one or more processors; and
   memory storing instructions that, when executed by the one or more processors, cause the autonomous vehicle control apparatus to:
   determine, after the vehicle stops and based on the sensing information associated with the first entity and the image of the first entity, whether the first entity is estimated to reach the vehicle at a first point in time, wherein the first point in time is identified as a point in time occurring after a predetermined time duration from a second point in time at which a door is to be opened,
   based on the determination, control a position of the door, and
   determine whether the second entity approaching the vehicle is estimated to board the vehicle, based on the sensing information of the second entity and the image of the second entity after causing the door open.

2. The autonomous vehicle control apparatus of claim 1, wherein the instructions, when executed by the one or more processors, cause the autonomous vehicle control apparatus to control the position of the door by causing the door to be closed based on a determination that the first entity is estimated to reach the vehicle at the first point in time.

3. The autonomous vehicle control apparatus of claim 1, wherein the instructions, when executed by the one or more processors, cause the autonomous vehicle control apparatus to control the position of the door by causing the door to be opened based on a determination that the first entity is estimated to not reach the vehicle at the first point in time.

4. The autonomous vehicle control apparatus of claim 1, wherein the instructions, when executed by the one or more processors, further cause the autonomous vehicle control apparatus to, after causing the door to open, determine whether a passenger of the vehicle gets on or off the vehicle.

5. The autonomous vehicle control apparatus of claim 1, wherein the instructions, when executed by the one or more processors, further cause the autonomous vehicle control apparatus to determine whether the second entity is present around the vehicle at a point in time when a passenger completely gets off or on the vehicle when it is determined that the passenger gets off or on after causing the door to open.

6. The autonomous vehicle control apparatus of claim 1, wherein the instructions, when executed by the one or more processors, further cause the autonomous vehicle control apparatus to, based on determining that the second entity is not present around the vehicle at a point in time when a passenger completely gets off or on the vehicle, output a notification that the door is scheduled to be closed.

7. The autonomous vehicle control apparatus of claim 6, wherein the instructions, when executed by the one or more processors, further cause the autonomous vehicle control apparatus to, after outputting the notification that the door is scheduled to be closed, determine whether the second entity is approaching the vehicle.

8. The autonomous vehicle control apparatus of claim 7, wherein the instructions, when executed by the one or more processors, further cause the autonomous vehicle control apparatus to, based on determining that the second entity is approaching the vehicle, determine whether the second entity is estimated to board the vehicle.

9. The autonomous vehicle control apparatus of claim 8, wherein the instructions, when executed by the one or more processors, cause the autonomous vehicle control apparatus to determine whether the second entity is estimated to board the vehicle based on a time required for the second entity to reach the vehicle.

10. The autonomous vehicle control apparatus of claim 9, wherein the instructions, when executed by the one or more processors, cause the autonomous vehicle control apparatus to determine whether the second entity is estimated to board the vehicle based on at least one of: a boarding probability that the second entity will board the vehicle or an expected route of the second entity.

11. The autonomous vehicle control apparatus of claim 8, wherein the instructions, when executed by the one or more processors, cause the autonomous vehicle control apparatus to determine whether the second entity is estimated to board the vehicle based on at least one of: a moving direction of the second entity, a moving velocity of the second entity, or tracking data of the second entity.

12. The autonomous vehicle control apparatus of claim 8, wherein the instructions, when executed by the one or more processors, cause the autonomous vehicle control apparatus to determine whether the second entity is estimated to board the vehicle based on an average moving velocity of the second entity.

13. The autonomous vehicle control apparatus of claim 8, wherein the instructions, when executed by the one or more processors, cause the autonomous vehicle control apparatus to determine whether the second entity is estimated to board the vehicle based on at least one of: a face direction of the second entity or a gaze direction of the second entity, wherein the face direction of the gaze direction is determined based on an image of the second entity.

14. The autonomous vehicle control apparatus of claim 10, wherein the instructions, when executed by the one or more processors, cause the autonomous vehicle control apparatus to calculate the time required for the second entity to reach the vehicle, the boarding probability that the second entity will board the vehicle or the expected route of the second entity based on an artificial intelligence model to which the sensing information is input.

15. The autonomous vehicle control apparatus of claim 8, wherein the instructions, when executed by the one or more processors, cause the autonomous vehicle control apparatus to perform learning through a second artificial intelligence model by inputting an image of the second entity and pre-stored sensing information associated with the second entity and determine whether the second entity is estimated to board the vehicle, based on the learning result.

16. The autonomous vehicle control apparatus of claim 9, wherein the instructions, when executed by the one or more processors, cause the autonomous vehicle control apparatus to determine that the second entity is estimated to board the vehicle based on the time required for the second entity to reach the vehicle is being less than or equal to a threshold time.

17. The autonomous vehicle control apparatus of claim 10, wherein the instructions, when executed by the one or more processors, cause the autonomous vehicle control apparatus to determine that the second entity is estimated to board the vehicle based on the boarding probability of the entity being greater than a threshold value.

18. The autonomous vehicle control apparatus of claim 8, wherein the instructions, when executed by the one or more processors, cause the autonomous vehicle control apparatus to allow the door to be opened based on determining that the second entity is estimated to board the vehicle.

19. An autonomous vehicle control method comprising:
obtaining sensing information associated with a first entity around a vehicle;
obtaining an image of the first entity;
determining, after the vehicle stops and based on the sensing information associated with the first entity and the image of the first entity, whether the first entity is estimated to reach the vehicle at a first point in time, wherein the first point in time is identified as a point in time occurring after a predetermined time duration from a second point in time at which a door of the vehicle is to be opened;
based on the determining whether the first entity is estimated to reach the vehicle, controlling a position of the door;
after causing the door to open, determining whether a second entity approaching the vehicle is estimated to board the vehicle; and
based on the determining whether the second entity is estimated to board the vehicle, controlling the position of the door.

20. The autonomous vehicle control apparatus of claim 1, wherein the instructions, when executed by the one or more processors, cause the autonomous vehicle control apparatus to:
based on the determination of whether the second entity is estimated to board the vehicle, adjust a point in time at which the position of the door is to be controlled.

* * * * *